(12) United States Patent
Huang et al.

(10) Patent No.: US 7,408,180 B2
(45) Date of Patent: Aug. 5, 2008

(54) COMPENSATION APPARATUS FOR IMAGE SCAN

(75) Inventors: Chih-Wen Huang, Hsinchu (TW); Cheng-Kuei Chen, Hsinchu (TW); Jen-Shou Tseng, Miao-Li Hsien (TW)

(73) Assignee: Transpacific IP, Ltd., Taipei (TW)

( * ) Notice: Subject to any disclaimer, the term of this patent is extended or adjusted under 35 U.S.C. 154(b) by 0 days.

(21) Appl. No.: 11/618,147

(22) Filed: Dec. 29, 2006

(65) Prior Publication Data
US 2007/0152145 A1 Jul. 5, 2007

Related U.S. Application Data

(62) Division of application No. 09/922,099, filed on Aug. 3, 2001, now Pat. No. 7,236,272.

(51) Int. Cl.
*G01N 21/86* (2006.01)
(52) U.S. Cl. .................. 250/559.4; 250/559.39; 358/488
(58) Field of Classification Search ........... 358/504, 358/497, 486, 474, 471, 488, 406, 483, 482; 250/559.4, 559.39, 55.44
See application file for complete search history.

(56) References Cited

U.S. PATENT DOCUMENTS

| 4,210,818 A | 7/1980 | Green et al. .......... 250/559.02 |
|---|---|---|
| 4,564,290 A | 1/1986 | Bell et al. .................. 211/41.1 |
| 5,091,654 A | 2/1992 | Coy et al. ................. 250/559.4 |
| 5,142,138 A | 8/1992 | Yonezawa et al. ......... 250/208.1 |
| 5,760,412 A * | 6/1998 | Yang et al. ................ 250/559.4 |
| 5,969,845 A * | 10/1999 | Tsai et al. .................... 359/210 |
| 6,011,632 A | 1/2000 | Chiang ........................ 358/406 |
| 6,118,860 A | 9/2000 | Hillson et al. ............... 379/155 |
| 6,141,684 A | 10/2000 | McDonald et al. .......... 709/222 |
| 6,243,450 B1 | 6/2001 | Jansen et al. ................ 379/144 |
| 6,388,778 B1 * | 5/2002 | Ko-Chien .................... 358/497 |
| 6,657,748 B1 * | 12/2003 | Okita et al. .................. 358/461 |
| 6,657,749 B1 | 12/2003 | Beeson ........................ 358/471 |
| 2002/0140996 A1 | 10/2002 | Spears et al. ................ 358/504 |
| 2006/0291007 A1 | 12/2006 | Huang et al. ................ 358/747 |

* cited by examiner

*Primary Examiner*—Georgia Y. Epps
*Assistant Examiner*—Tony Ko
(74) *Attorney, Agent, or Firm*—Stolowitz Ford Cowger LLP

(57) ABSTRACT

A compensation apparatus for image scan, applied to an optical scanner with a platform, on which an object to be scanned is disposed. The optical scanner has a photosensitive apparatus with a set of scan photosensitive devices and a storage apparatus. When the object is scanned by the set of scan photosensitive devices, a scanned image is obtained and saved in the storage apparatus temporarily. The compensation apparatus has a set of calibration boards, a set of calibration photosensitive devices and an image processor. The set of calibration boards has two calibration boards located at two sides of the platform. The set of calibration photosensitive devices is located at two sides of the set of scan photosensitive device. The image processor is used to extract and compare the calibrated image, so as to adjust the scanned image.

24 Claims, 8 Drawing Sheets

COMPENSATION APPARATUS FOR IMAGE SCAN

The present application is a divisional of U.S. application Ser. No. 09/922,099, filed Aug. 3, 2001 now U.S. Pat. No. 7,236,272. The entire disclosure of prior application 09/922,099 is considered as being part of the disclosure of the present application and is hereby incorporated by reference herein in its entirety.

BACKGROUND OF THE INVENTION

1. Field of the Invention

The invention relates in general to a compensation apparatus for image scan, and more particularly, to an apparatus for compensating the optical path deviation caused by vibration of an optical scanner.

2. Description of the Related Art

As use has increased and with breakthroughs in the technology of photosensitive devices, the resolution of optical scanners has steadily increased from the early 200 dots per inch (dpi) for a black-and-white scan and gray scale scan to 300 dpi, 600 dpi, 1000 dpi, and now 2000 dpi and 4000 dpi for a color scan today. As the resolution is continuously enhanced, the scanner becomes more and more sensitive to the machine's vibration.

In a typical optical scanner, after first being projected onto an object to be scanned and then reflected by the object to a series of planar mirrors, a light source is subsequently projected onto a charge coupled device (CCD) to be converted into a digital signal to be read. When the driving system operates to drive the lens or the charge coupled device, vibration occurs that affects the scanning quality. In FIG. 1, the optical path deviation caused by the vibration of the scanner is shown. While the optical scanner is performing a scan, the driving system 109 drives the optical system 111 (that is, the planar compound mirror 104, the lens 106 and the photosensitive device 110) along the scanning direction 107. As the optical system 111 moves a small distance, the photosensitive apparatus 110 scans and detects the object 100 once. The optical path is from the light source (not shown), the object 100, the planar compound mirror 104, the lens 106 and the photosensitive apparatus 110. During the scan, the driving system generates a vibration to the optical system 111, so that an optical path deviation N'N is generated. A chromatic aberration occurs to the scanned image, such that the image quality is deteriorated. The vibration of the optical system and the optical path deviation N'N may occur along the x-axis, y-axis and z-axis. FIG. 1 only illustrates the vibration along the y-axis to describe the optical path deviation along z-axis as an example.

SUMMARY OF THE INVENTION

The invention provides a compensation apparatus for image scan applied to an optical scanner, so that the optical path deviation along the x-axis, y-axis and z-axis can be compensated, and the image quality improved.

The image scan compensation apparatus can be applied to an optical scanner having a platform, a photosensitive device and a storage apparatus. An object-to-be-scanned is disposed on the platform. The photosensitive apparatus has a set of scan photosensitive devices therein. When this set of scan photosensitive devices scans the object, a scanned image is obtained and temporarily stored in the storage apparatus. The compensation apparatus comprises a set of calibration boards, a set of calibration photosensitive devices and an image processor. The set of calibration boards has two calibration boards located at two sides of the platform. The set of calibration photosensitive devices are located at two sides of the set of scan photosensitive devices to detect the calibration boards and to obtain a calibrated image. The image processor is used to extract and compare the calibrated image to adjust the scanned image.

In the compensation apparatus of the invention, the calibration boards are located at two sides of the platform. The calibration boards are strip-like boards with a width linearly increased or decreased along the scanning direction.

In the compensation apparatus, the image processor calculates the optical path deviation by extracting and comparing the calibrated image. According to the pattern proportion and the displacement of the calibrated image on the calibration boards detected by the set of calibration photosensitive devices, the direction and magnitude of the optical path deviation are obtained. The optical path deviation along the direction for scanning the set of photosensitive devices (x-axis, that is, the CCD direction) can be calculated to correct the scanned image according to the displacement of the calibrated images detected by the set of calibration photosensitive devices. The optical path deviations along the other vertical object scanning directions (that is, the y-axis direction and the z-axis direction) can be calculated for correction according to the proportion variation and the displacement of the calibrated images detected at the two sides of the set of calibration photosensitive devices. In addition, the optical path deviations twisting around the y-axis and the z-axis are also calculated according to the optical path deviations along the y- and z-axes.

Both the foregoing general description and the following detailed description are exemplary and explanatory only and are not restrictive of the invention, as claimed.

DESCRIPTION OF THE PREFERRED EMBODIMENTS

Figure 1:
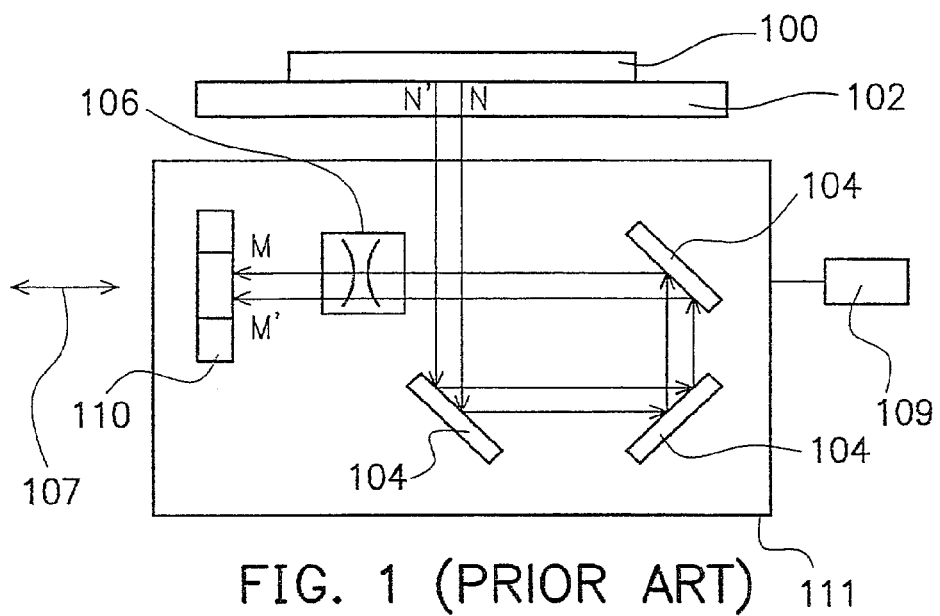
FIG. 1 shows an optical path deviation caused by vibration of the conventional optical scanner.
Figure 2:
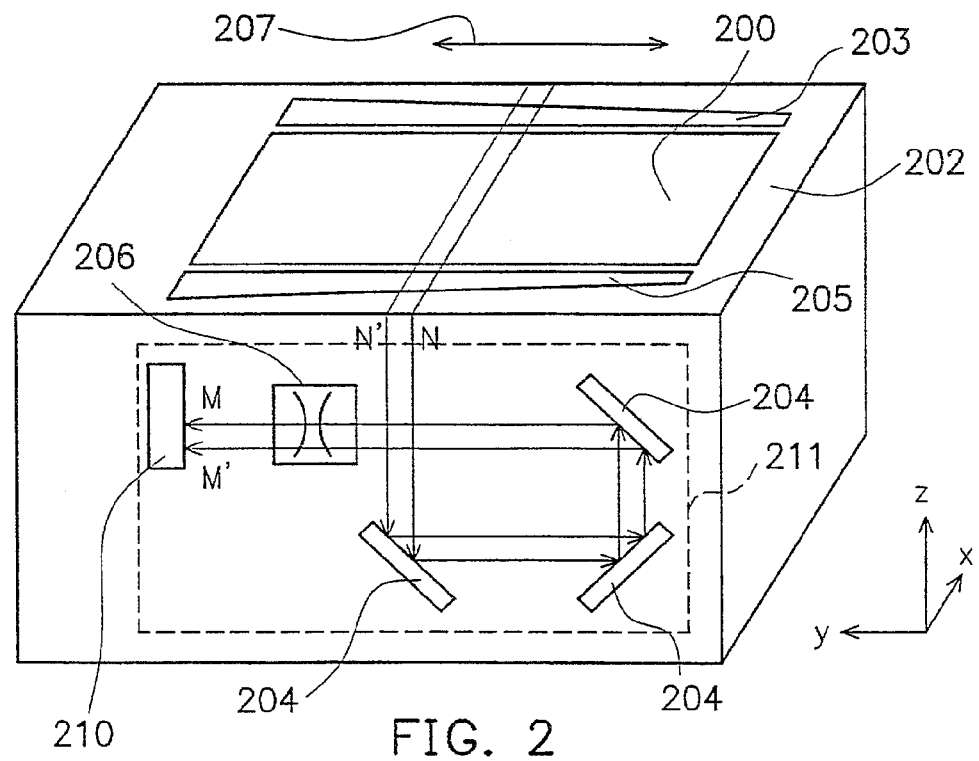
FIG. 2 shows an embodiment of a compensation apparatus for image scan of an optical scanner according to the invention.
Figure 3:
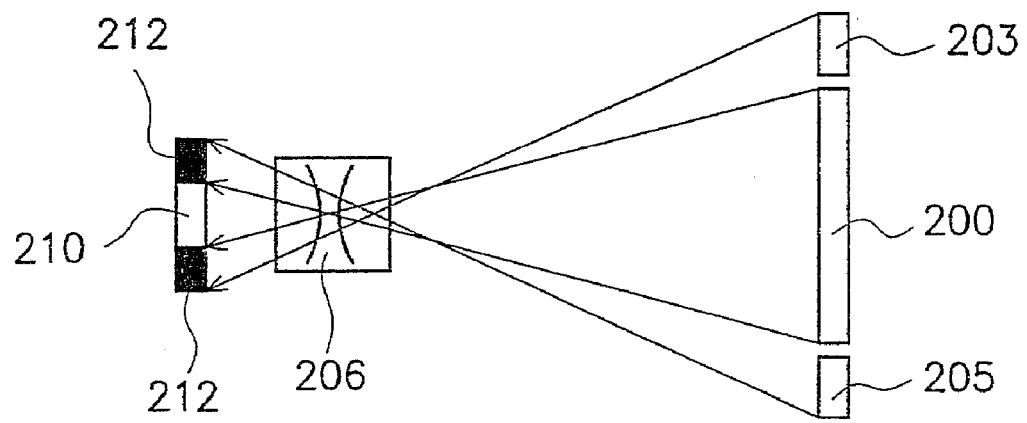
FIG. 3 shows the optical path of FIG. 2.
Figure 4:
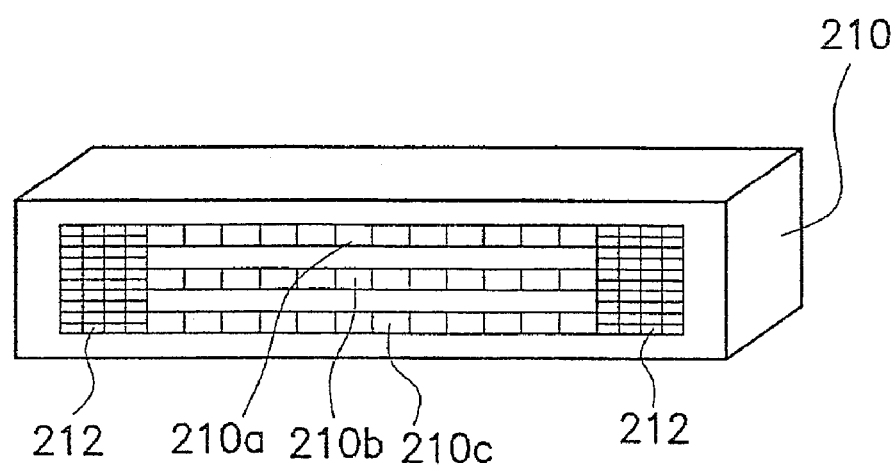
FIG. 4 shows a photosensitive apparatus of the compensation apparatus.

FIG. 2 shows an embodiment of a compensation apparatus for image scan of an optical scanner. FIG. 3 shows the optical path of FIG. 2 (the planar mirror is omitted), and FIG. 4 shows the photosensitive apparatus of the compensation apparatus.

In FIG. 2, the compensation apparatus is installed in an optical scanner. The optical scanner has a light source (not shown), a platform 202 for locating an object-to-be-scanned 200, a photosensitive apparatus 210 which includes a set of scan photosensitive devices R, G, B 210a, 210b, 210c (as shown in FIG. 4) and a storage apparatus (not shown). The scanning direction is referred to as the y-axis, the direction along the platform 202 and vertical to the y-axis is referred to as the x-axis. Using the right hand rule, a z-axis vertically coming out of the platform 202 can be obtained.

When the optical scanner is scanning, a driving system (not shown) drives the optical system 211 (that is, the set of planar mirrors 204, the lens 206 and the photosensitive apparatus 210) to move along the scanning direction 207. When the optical system 211 moves over a small distance, an image is scanned and temporarily stored in the storage apparatus. The optical path for the scan includes projecting light from the light source to the object-to-be-scanned 200, reflection by the object-to-be-scanned 200 to the set of planar mirrors 204, incident to the corresponding scan photosensitive devices 210a, 210b, 210c of the photosensitive apparatus 210. The photosensitive apparatus 210 is in a strip shape and vertical to the scanning direction 207.

However, vibration occurs to the driving system. While the scan is being performed, the optical system 211 is vibrating causing an optical path deviation N'N. The optical path deviation N'N caused by vibration may occur along x-, y- and z-axis. For convenience, FIG. 2 illustrates the optical deviation N'N caused by vibration along the y-axis only. The optical path N-M is altered to N'-M' due to vibration as shown in FIG. 2, and an optical path deviation results. The compensation apparatus for image scan provided by the invention for compensating the optical path deviation is described as follows.

Figure 12:
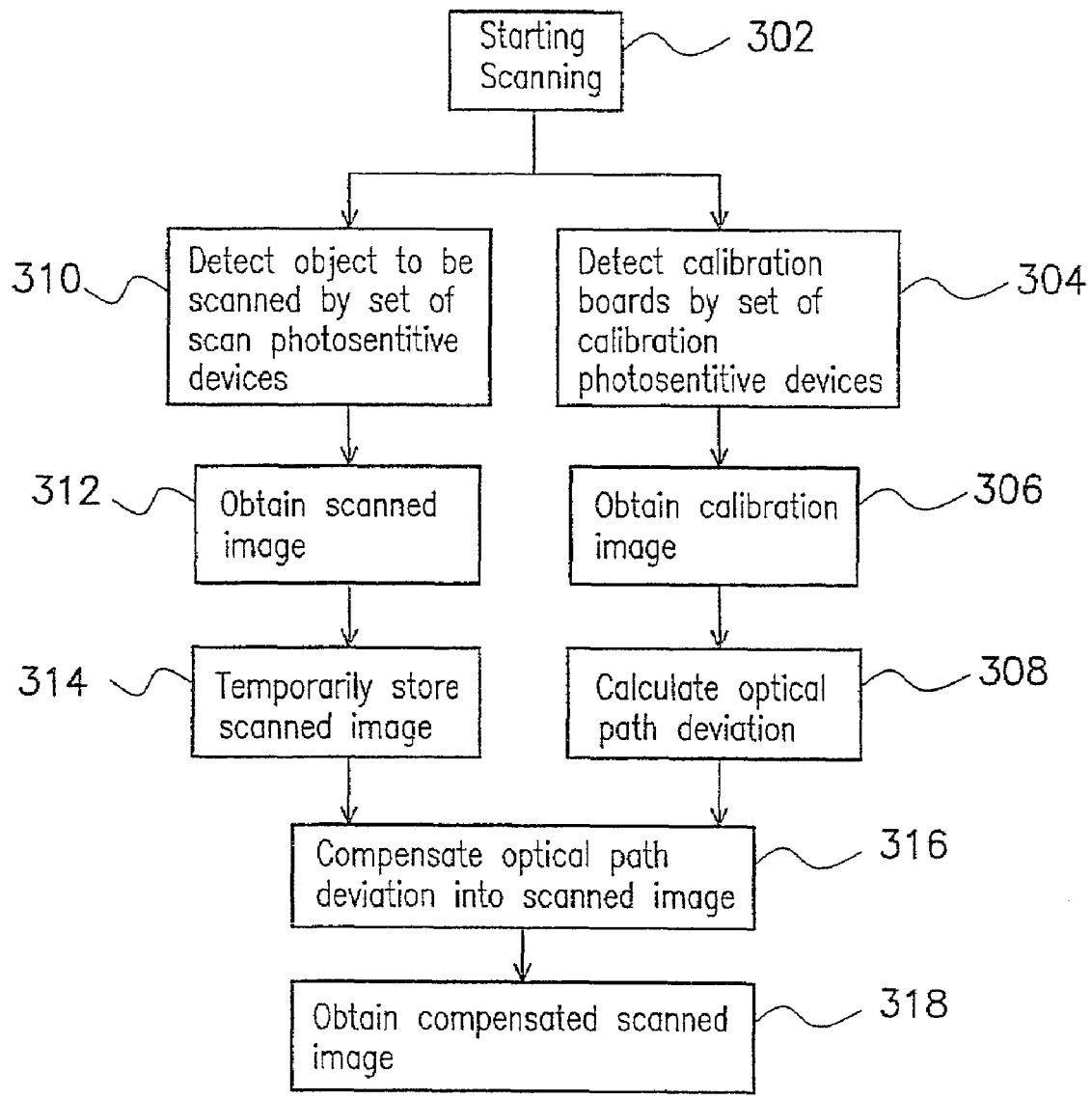
FIG. 12 shows a flow chart for implementing the photodetector of the compensation apparatus.

The compensation apparatus comprises a set of calibration boards 203, 205 located at two sides of the platform 202, (FIG. 2), and a set of calibration photosensitive devices 212 located at two sides of the set of scan photosensitive devices 210a, 210b and 210c to obtain the set of calibrated images by detecting the calibration boards 203, 205 (FIG. 3). The compensation apparatus further comprises an image processor (not shown) to extract and compare the calibrated images, in order to calculate the optical path deviation N'N, so that the scanned image can be adjusted. Referring to FIG. 12, a flow chart for implementing the optical photodetector of the compensation apparatus for image scan of the optical scanner is illustrated. When the scan is started in step 302, the set of the scan photosensitive devices 210a, 210b, 210c of the photosensitive apparatus 210 and the set of calibration photosensitive devices 212 simultaneously detect the object-to-be-scanned 200 (step 310) and the calibration boards 203, 205 (step 304), respectively. A scanned image and a calibrated image are obtained in steps 312 and 306. The scanned image is temporarily stored in the storage apparatus in step 314. The optical path deviation is calculated according to the obtained calibrated image in step 308. The image processor is used to compensate the optical path deviation N'N into the scanned image in step 316, so that an ideal image (the image without the optical path deviation N'N) is obtained in step 318. The above set of photosensitive devices 212, as shown in FIG. 4, is comprised of several calibration photosensitive devices arranged as an array with L rows and K columns at two sides of the scan photosensitive devices 210a, 210b and 210c. L and K are integers larger than 1. In addition, the set of scan photosensitive devices has several scan photosensitive devices, and the size of the calibration photosensitive devices is smaller than that of the scan photosensitive devices (that is, the integration of the set of calibration photosensitive devices is larger than that of the set of the scan photosensitive devices) for the purpose of enhancing detection accuracy.

Figure 5:
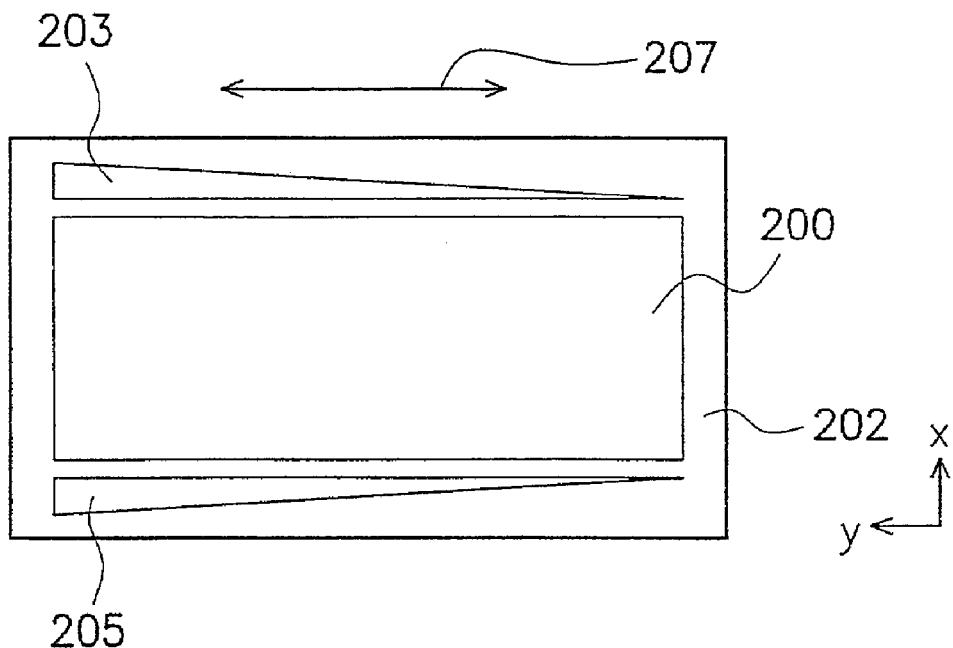
FIGS. 5 and 6 show the calibration boards of the compensation apparatus.
Figure 6:
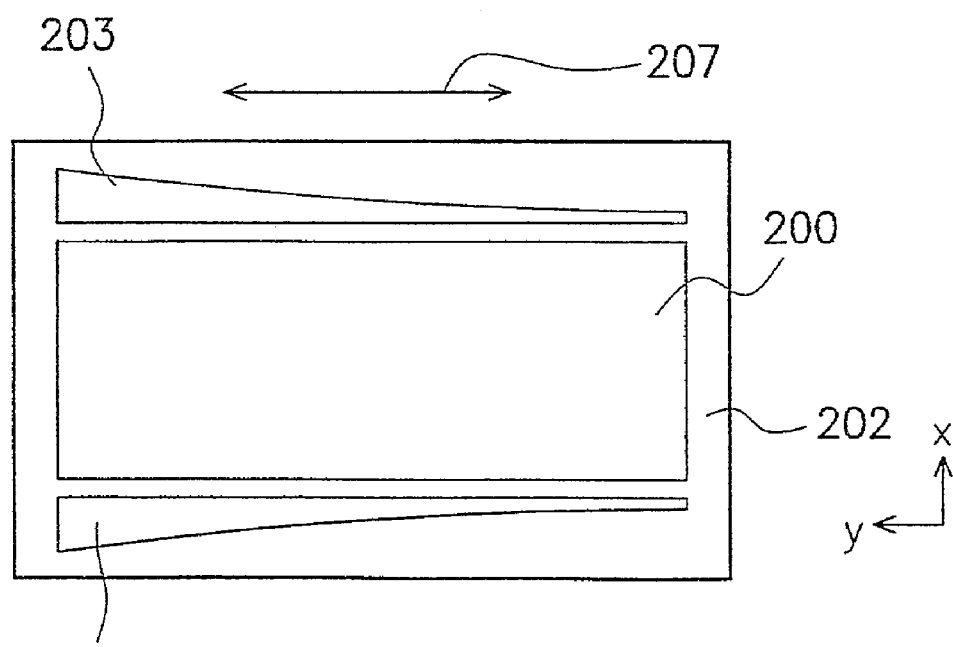
Figure 7:
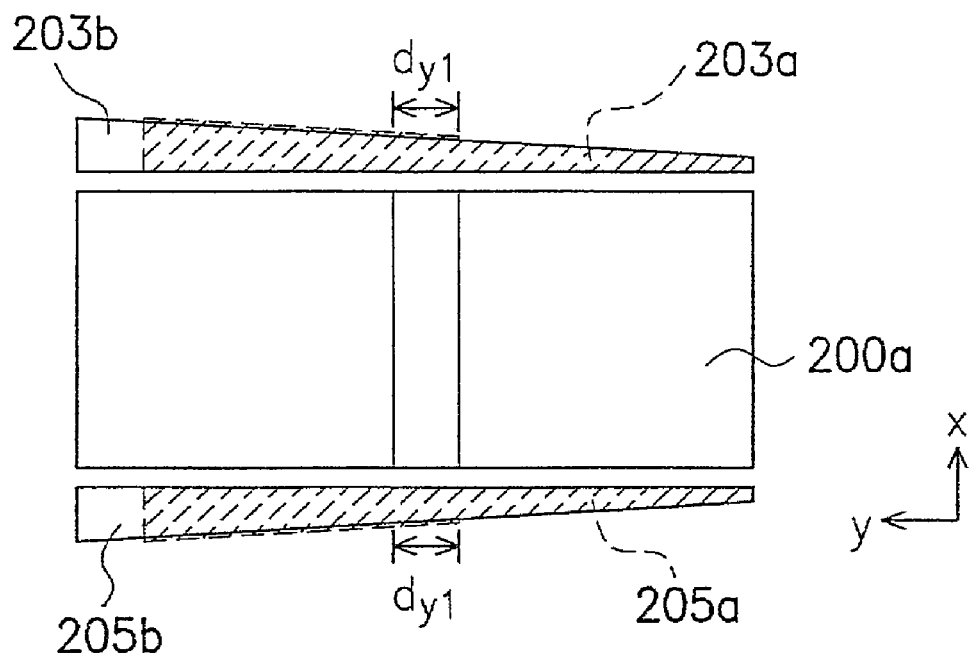
FIGS. 7 to 11 show alteration of the calibrated images detected by the set of calibration photosensitive devices caused by optical path deviation.

In the above method of calculating the optical path deviation N'N, the width of the strip-like calibration boards 203, 205 is increased or decreased linearly along the scanning direction 207. Its plane has a trapezium shape as shown in FIG. 2, a triangular shape as shown in FIG. 5, or a curve perimeter as shown in FIG. 6. The objective of linearly increasing the width of the calibration boards 203, 205 is to use the width as a distinction value for scanning along the direction 207. That is, at any position along the scanning direction 207, the width has a unique magnitude different from any other positions. It is thus able to determine at which position of the object-to-be-scanned 200 the vibration occurs. Further, according to the variation of the width, whether the scanned image is twisted can also be determined. The method for calculating the direction and magnitude of the optical deviation path N'N is described as follows. The optical path along y-axis:

In FIG. 7, the variation of calibrated image when the optical path deviates along the y-axis is illustrated. If an optical path deviation of dy1 occurs along the y-axis, the calibrated images 203a and 205a at two sides of the scanned image 200a are displaced due to the image vibration. The hatched portion 203b and 205b in the figure indicates the ideal calibrated images while the vibration occurs. Due to the vibration along the y-axis, a section of the calibration boards 203 and 205 (FIG. 2) will be skipped without being detected by the calibration photosensitive device 212 (FIG. 3). A discontinuous variation of the calibrated images 203a and 205a thus occurs. Therefore, the magnitude and position of optical path deviation in y-axis can be derived from the calibrated images 203a, 205a detected by the set of calibration photosensitive devices 212.

Figure 8:
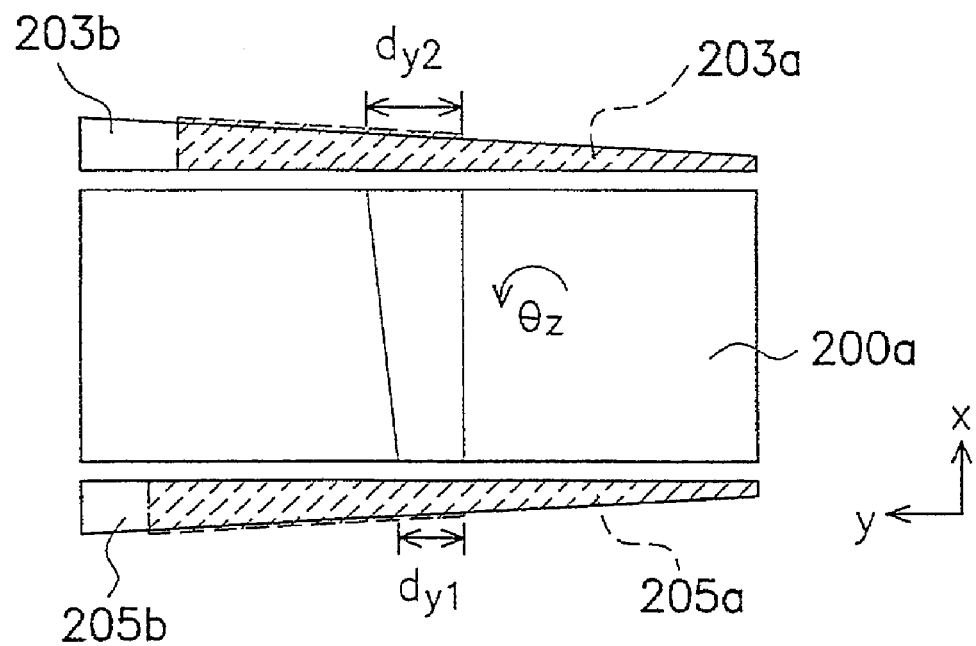

Similarly, referring to FIG. 8, the variation of the calibrated image obtained from the optical path deviation in y-axis (the optical path deviation at two sides of the platform is different) during the scanning process is shown. The optical path deviations N'N at two sides of the platform are represented by dy1 and dy2, showing that the scanned image 200a has been twisted by $\theta_z$ to a certain position (such as twisted around the z-axis).

Figure 9:
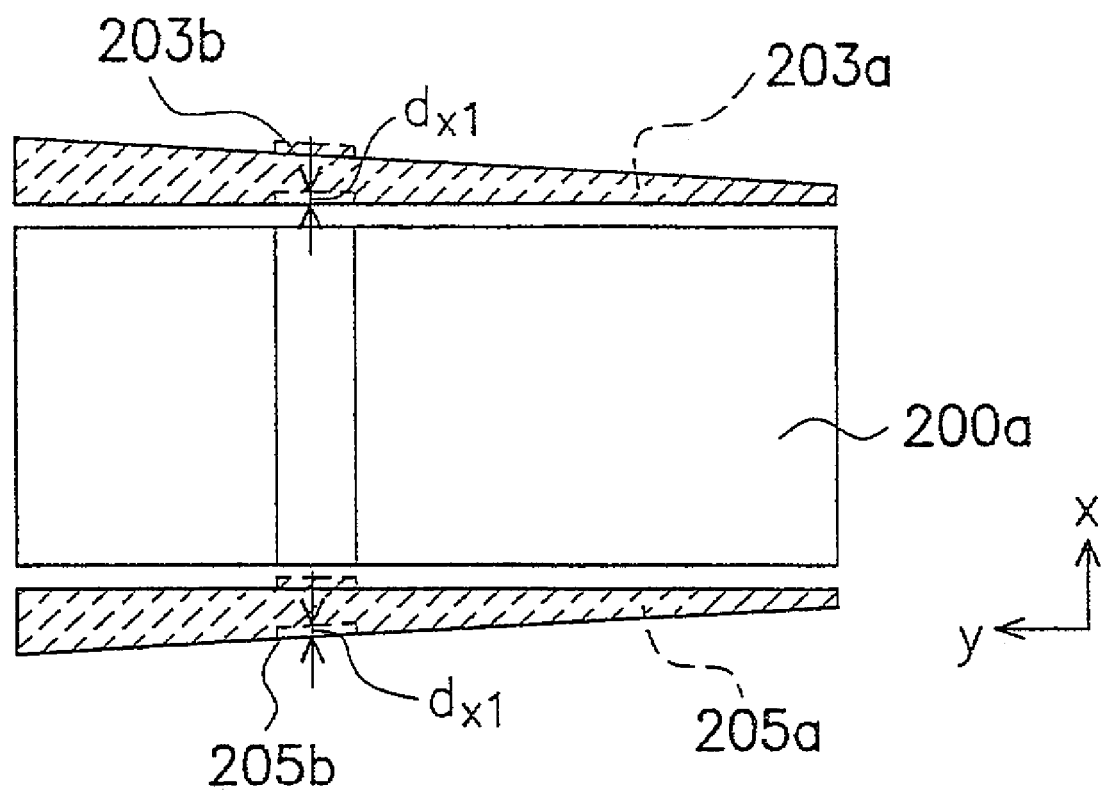

The Optical Path Deviation in x-axis:

In FIG. 9, the variation of calibrated image when the optical path deviates along the x-axis is illustrated. If an optical path deviation of dx1 occurs along the x-axis, the calibrated images 203a and 205a (the hatched portion) at two sides of the scanned image 200a are displaced due to the image vibration. The hatched portion 203b and 205b in the figure indicates the ideal calibrated images while the vibration occurs. Since the optical path deviation N'N is the same at two sides of the platform, the calibration boards 203 and 205 (FIG. 2) detected by the calibration photosensitive device 212 jump with a distance along the x-axis simultaneously, and a discontinuous variation occurs to the calibrated images 203a and 205a. Therefore, the magnitude and position of optical path deviation in x-axis of the scanned image 200a detected from the set of scan photosensitive devices 210a, 210b, 210c (FIG. 4) can be derived from the calibrated images 203a, 205a detected by the set of calibration photosensitive devices 212.

Figure 10:
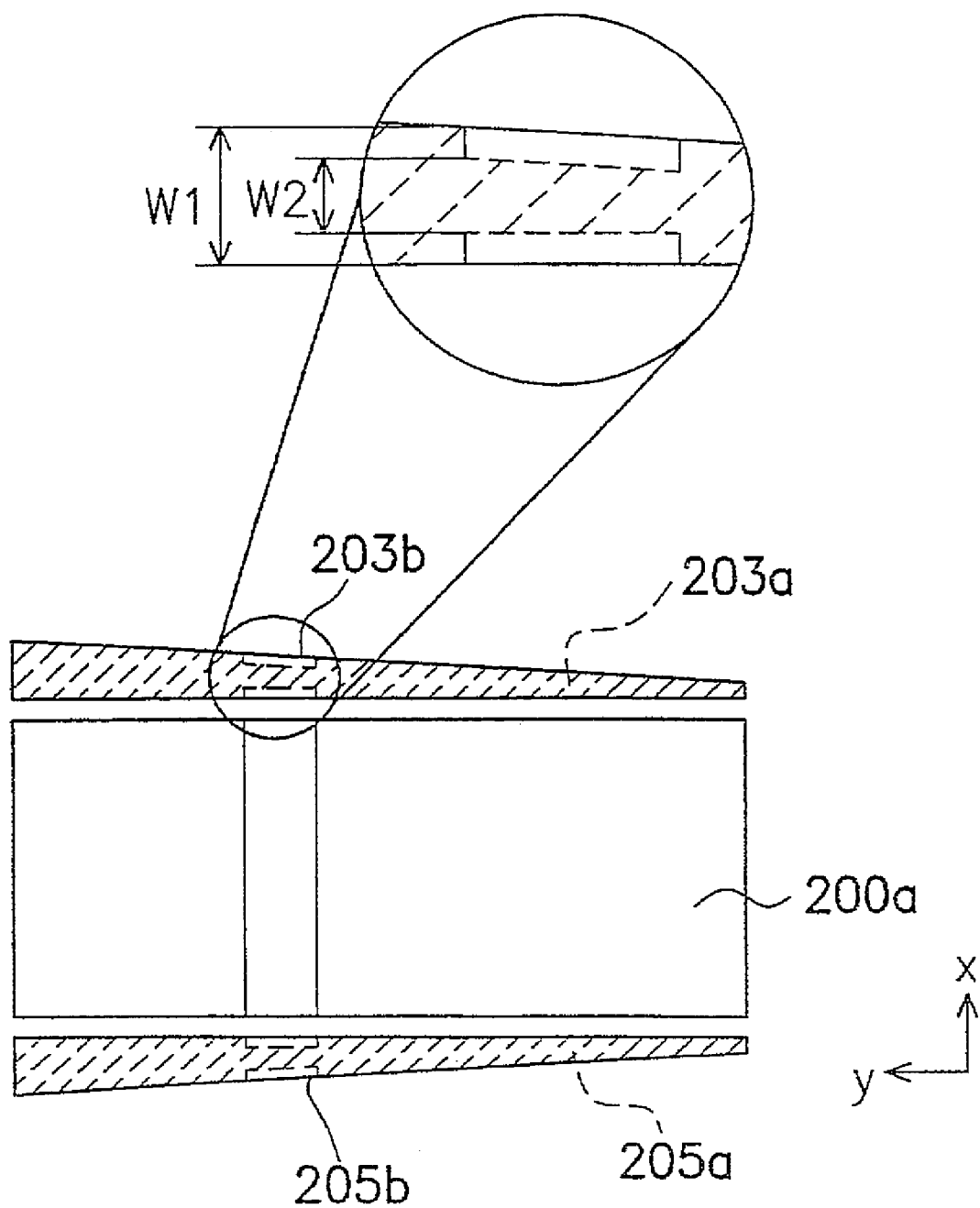

The Optical Path Deviation in z-axis:

In FIG. 10, the variation of calibrated image obtained from the optical path deviation along the z-axis (when the optical path deviation is the same at two sides) is shown. When optical path deviates in z-axis for scanning, the position of the image alters due to vibration (while the hatched portion 203b and 203b indicate the ideal calibrated image without vibration). Since the optical path deviation N'N in z-axis is the same at two sides of the platform, a vague (defocused) section and magnified or shrunk ratio occur to the calibrated images 203a and 205a detected by the calibration photosensitive device 212 (FIG. 3). The magnified or shrunk ratio can be obtained from w2/w1, in which w2 is the width of the calibrated images 203a, 205a after vibration, and w1 is the ideal width of the calibrated images 203a, 205a without vibration. Therefore, the magnitude and position of the optical path deviation in z-axis of the scanned image can be derived from the set of scan photosensitive devices 210a, 210b and 210c (FIG. 4).

Figure 11:
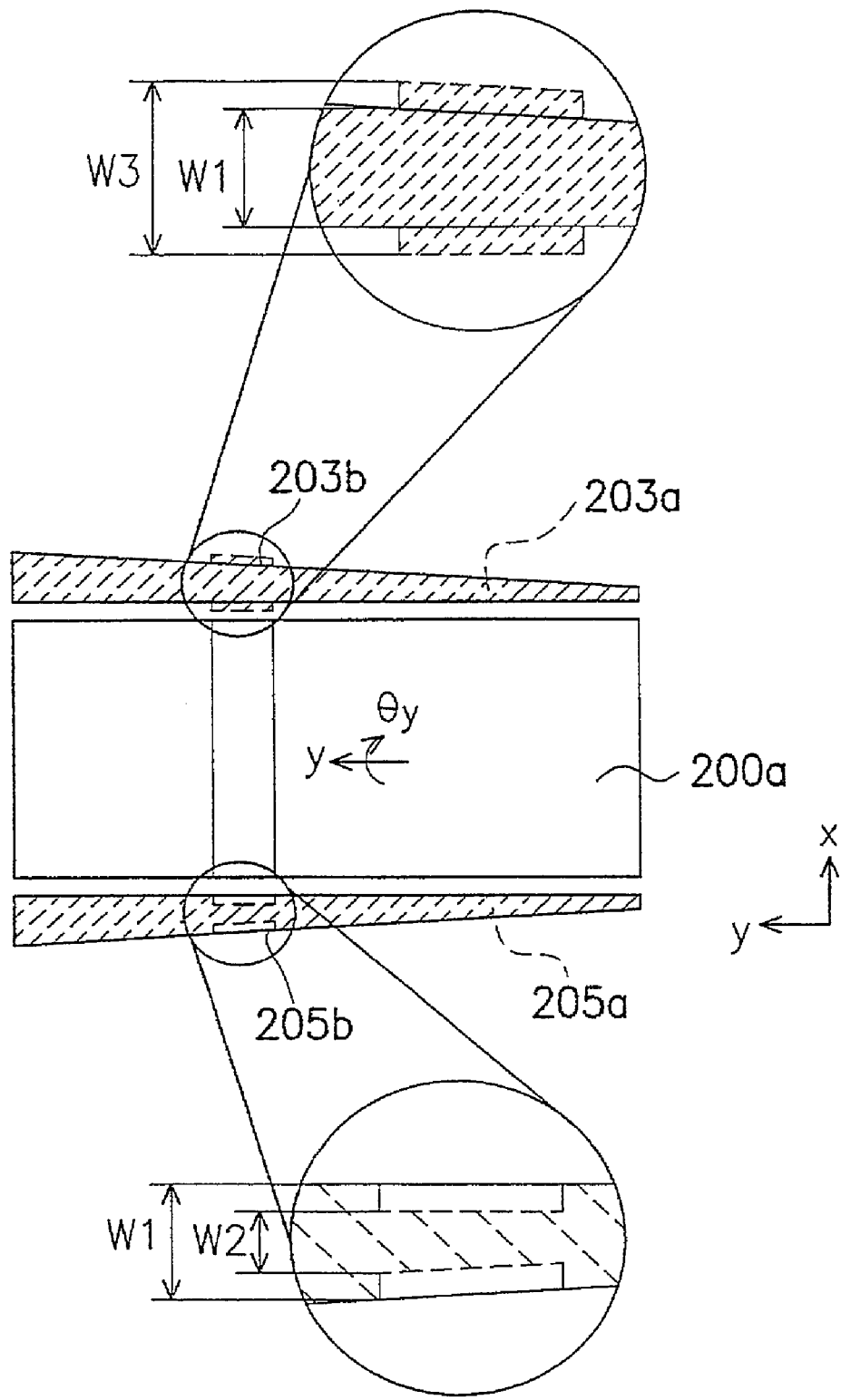

Similarly, referring to FIG. 11, the calibrated image variation according to the optical path deviation in z-axis (when the optical path at two sides of the platform is different} is shown. Due to the difference of the optical path deviation at two sides of the platform, a vague (defocused) section and magnified or shrunk ratio occur to the calibrated images 203a and 205a detected by the calibration photosensitive device 212 (FIG. 3). The magnified or shrunk ratio of the calibrated images 203a and 205a is different and obtained from w2/w1 and w3/w1, respectively. The parameter w3 is the width of the calibrated image 203a after vibration, w2 is the width of the calibrated image 205a after vibration, while w1 is the ideal width without vibration for both the calibration images 203a and 205a. Meanwhile, the scanned image 200a is twisted by an angle $\theta_y$ at a certain position (such as rotating around the y-axis).

The above embodiment describes the invention by setting the calibration boards at two sides of the platform. However, according to the spirit of the invention, the calibrated boards detected by the set of calibration photosensitive devices are images (that is, plane data instead of point or line data). Thus, if the calibration board is used at only one side of the platform, the above objective can also be achieved. Therefore, one can dispose the calibration board at one side of the platform, and the set of calibration photosensitive devices at the other side.

According to the above embodiment, the invention has at least the following advantages:

(1) The compensation apparatus of image scan uses the strip-like calibration boards where the width varies linearly along the scanning direction, so that the detected calibrated image can be used to distinguish the position of the scanned image. According to the position and width variation of the calibrated image, the optical path deviation in x-, y- and z-axes can be calculated. Consequently, the optical path deviation for twisting around the y- and z-axes can be derived.

(2) In the above compensation apparatus, the calibration boards are set at two sides of the scan photosensitive device, so that calibrated images are obtained while scanning an object. The optical path deviation and the direction thereof can be calculated. An image processor is further used to compensate the optical path deviation into the scanned image, so that the vibration of scanned image due to the vibration of the optical scanner is improved, and the image quality is enhanced.

(3) A software image compensation is used in the compensation apparatus, so that a real time image compensation is achieved without the problems caused by time delay.

Other embodiments of the invention will appear to those skilled in the art from consideration of the specification and practice of the invention disclosed herein. It is intended that the specification and examples are to be considered as exemplary only, with a true scope and spirit of the invention being indicated by the following claims.

What is claimed is:

1. A compensation apparatus comprising:
a set of calibration boards, comprising two calibration boards approximately located at two sides of a platform, where the calibration boards provide a pattern that varies along one or more axial directions of the compensation apparatus;
a set of calibration photosensitive devices, approximately located at two sides of a set of scan photosensitive devices, the set of calibration photosensitive devices configured to obtain a set of calibrated images by detecting the calibration boards; and
an image processor configured to calculate an optical path deviation to adjust the scanned image, and wherein the image processor is further configured to compare the calibrated images to calculate the optical path deviation based at least in part on a variation of the pattern in one or more of the axial directions.

2. The compensation apparatus according to claim 1, wherein the set of calibration photosensitive devices comprises a plurality of calibration photosensitive devices arranged in a L×K array at two sides of the set of scan photosensitive devices, and wherein L and K are integers larger than 1.

3. The compensation apparatus according to claim 2, wherein the set of scan photosensitive devices comprises a plurality of scan photosensitive devices, and wherein the calibration photosensitive devices have a dimension smaller than that of the scan photosensitive devices.

4. The compensation apparatus according to claim 1, wherein the calibration boards have a strip shape and a width increasing along a scanning direction.

5. The compensation apparatus according to claim 1, wherein the calibration boards have widths decreasing along a scanning direction.

6. The compensation apparatus according to claim 1, wherein the image processor is further configured to:
calculate the optical path deviation in an x-axis according to a displacement of the calibrated images detected by the set of calibration photosensitive devices;
calculate the optical path deviation in a y-axis according to the displacement of the calibrated images detected by the set of calibration photosensitive devices; and
calculate the optical path deviation in a z-axis according to the displacement of the calibrated images detected by the set of calibration photosensitive devices.

7. The compensation apparatus according to claim 6, wherein the image processor is further configured to
calculate the optical path deviation twisting around the y-axis according to the optical path deviation in the z-axis; and
calculate the optical path deviation twisting around the z-axis according to the optical path deviation in the y-axis.

8. The compensation apparatus according to claim 1, wherein a magnitude and direction of the optical path deviation is calculated based on a displacement of the calibrated images in one or more of the axial directions.

9. A compensation apparatus comprising:
a calibration board, approximately located at one side of a platform, the calibration board comprised of a pattern that varies along a direction of image processing;
a set of calibration photosensitive devices, approximately located at one side of a set of scan photosensitive devices, configured to obtain a calibrated image by detecting the calibration board; and
an image processor configured to calculate an optical path deviation based at least in part on the calibrated image to adjust the scanned image, and wherein the image processor is further configured to compare the calibrated image to calculate the optical path deviation based at least in part on a variation of the pattern in the direction of image processing.

10. The compensation apparatus according to claim 9, wherein the set of calibration photosensitive devices comprises a plurality of calibration photosensitive devices arranged at two sides of the set of scan photosensitive devices in an L×K array, wherein L and K are integers larger than 1.

11. The compensation apparatus according to claim 9, wherein the set of scan photosensitive devices comprise a plurality of scan photosensitive devices, and wherein the calibration photosensitive devices have a dimension smaller than that of the scan photosensitive devices.

12. The compensation apparatus according to claim 9, wherein the calibration boards have a strip shape and a width increasing along a scanning direction.

13. The compensation apparatus according to claim 9, wherein the calibration boards have a strip shape and a width decreasing along a scanning direction.

14. The compensation apparatus according to claim 9, wherein the image processor is further configured to:
    calculate the optical path deviation in an x-axis according to a displacement of the calibrated image detected by the set of calibration photosensitive devices;
    calculate the optical path deviation in a y-axis according to the displacement of the calibrated image detected by the set of calibration photosensitive devices; and
    calculate the optical path deviation in a z-axis according to the displacement of the calibrated image detected by the set of calibration photosensitive devices.

15. The compensation apparatus according to claim 14, wherein the image processor is further configured to:
    calculate the optical path deviation twisting around the y-axis according to the optical path deviation in the z-axis; and
    calculate the optical path deviation twisting around the z-axis according to the optical path deviation in the y-axis.

16. The compensation apparatus according to claim 9, wherein a magnitude and direction of the optical path deviation is calculated based on a displacement of the calibrated images in the direction of image processing.

17. A method, comprising:
    obtaining a calibrated image by detecting a calibration board approximately located at one side of a platform of a scanner with a set of calibration photosensitive devices, the calibration board providing a pattern that varies along one or more optical paths; and
    calculating an optical path deviation based at least in part on the calibrated image to adjust the scanned image, said calculating comprising comparing the calibrated image to calculate said optical path deviation based at least in part on a variation in the pattern along one or more of the optical paths.

18. The method according to claim 17, further comprising:
    calculating the optical path deviation in an x-axis according to a displacement of the calibrated image detected by the set of calibration photosensitive devices;
    calculating the optical path deviation in a y-axis according to the displacement of the calibrated image detected by the set of calibration photosensitive devices; and
    calculating the optical path deviation in a z-axis according to the displacement of the calibrated image detected by the set of calibration photosensitive devices.

19. The method according to claim 17, further comprising:
    calculating the optical path deviation twisting around the y-axis according to the optical path deviation in the z-axis; and
    calculating the optical path deviation twisting around the z-axis according to the optical path deviation in the y-axis.

20. The method according to claim 17, wherein a magnitude and direction of the optical path deviation is calculated based on a displacement of the calibrated images along one or more of the optical paths.

21. An apparatus, comprising:
    means for obtaining a calibrated image by detecting a calibration board approximately located at one side of a platform of a scanner with a set of calibration photosensitive devices, the calibration board providing a pattern that varies along one or more optical paths; and
    means for calculating an optical path deviation based at least in part on the calibrated image to adjust the scanned image, said means for calculating comprising means for comparing the calibrated image to calculate the optical path deviation based at least in part on a variation of the pattern along the one or more optical paths.

22. The apparatus according to claim 21, further comprising:
    means for calculating the optical path deviation in an x-axis according to a displacement of the calibrated image detected by the set of calibration photosensitive devices;
    means for calculating the optical path deviation in a y-axis according to the displacement of the calibrated image detected by the set of calibration photosensitive devices; and
    means for calculating the optical path deviation in a z-axis according to the displacement of the calibrated image detected by the set of calibration photosensitive devices.

23. The apparatus according to claim 22, further comprising:
    means for calculating the optical path deviation twisting around the y-axis according to the optical path deviation in the z-axis; and
    means for calculating the optical path deviation twisting around the z-axis according to the optical path deviation in the y-axis.

24. The apparatus according to claim 21, wherein a magnitude and direction of the optical path deviation is calculated based on a displacement of the calibrated images along the one or more optical paths.

* * * * *

UNITED STATES PATENT AND TRADEMARK OFFICE
CERTIFICATE OF CORRECTION

PATENT NO. : 7,408,180 B2 Page 1 of 1
APPLICATION NO. : 11/618147
DATED : August 5, 2008
INVENTOR(S) : Chih-Wen Huang It is certified that error appears in the above-identified patent and that said Letters Patent is hereby corrected as shown below:

At column 8, line 22, claim 21 delete "devices,the" and insert -- devices, the --, therefor.

Signed and Sealed this

Eighth Day of September, 2009

David J. Kappos
*Director of the United States Patent and Trademark Office*